United States Patent [19]

Miller

[11] 4,015,171

[45] Mar. 29, 1977

[54] RESETTABLE OVERCURRENT-PROTECTED DIRECT CURRENT POWER SUPPLY

[75] Inventor: Dale Lloyd Miller, Harrisburg, Pa.

[73] Assignee: International Telephone and Telegraph Corporation, Nutley, N.J.

[22] Filed: Feb. 6, 1976

[21] Appl. No.: 655,808

[52] U.S. Cl. .................................. 361/18; 321/14; 361/114

[51] Int. Cl.² ............................................ H02H 7/00

[58] Field of Search ............... 317/18 R, 14 C, 20, 317/33 R, 33 VR, 54; 321/14

[56] References Cited

UNITED STATES PATENTS

| | | | |
|---|---|---|---|
| 2,722,649 | 11/1955 | Immel et al. | 317/33 R X |
| 3,260,915 | 7/1966 | Gregg | 317/33 R X |
| 3,274,446 | 9/1966 | Nagata | 317/33 VR |
| 3,295,023 | 12/1966 | Peras | 317/54 |
| 3,364,392 | 1/1968 | Lafreniere | 317/33 VR |

*Primary Examiner*—Harry Moose
*Attorney, Agent, or Firm*—John T. O'Halloran; Alfred C. Hill; Peter C. Van Der Sluys

[57] ABSTRACT

A bistable magnetic switch circuit includes one terminal coupled to a source of direct current voltage, a contact coupled to the other terminal of the bistable switch circuit and an armature controlled by the bistable switch circuit to make and break contact with the contact, the bistable switch circuit being energized at a given trip-rated current. A transistor has its collector coupled to the other terminal of the bistable switch circuit, its emitter coupled to a utilizing load and its base coupled to the armature remote from the contact, the transistor being rendered non-conductive when the bistable switch circuit is energized to provide the desired overcurrent protection. A reset switch is coupled between the other terminal of the bistable switch circuit and ground potential to reset the bistable switch to prepare the bistable switch circuit to protect against a continuing or a new overcurrent condition.

22 Claims, 1 Drawing Figure

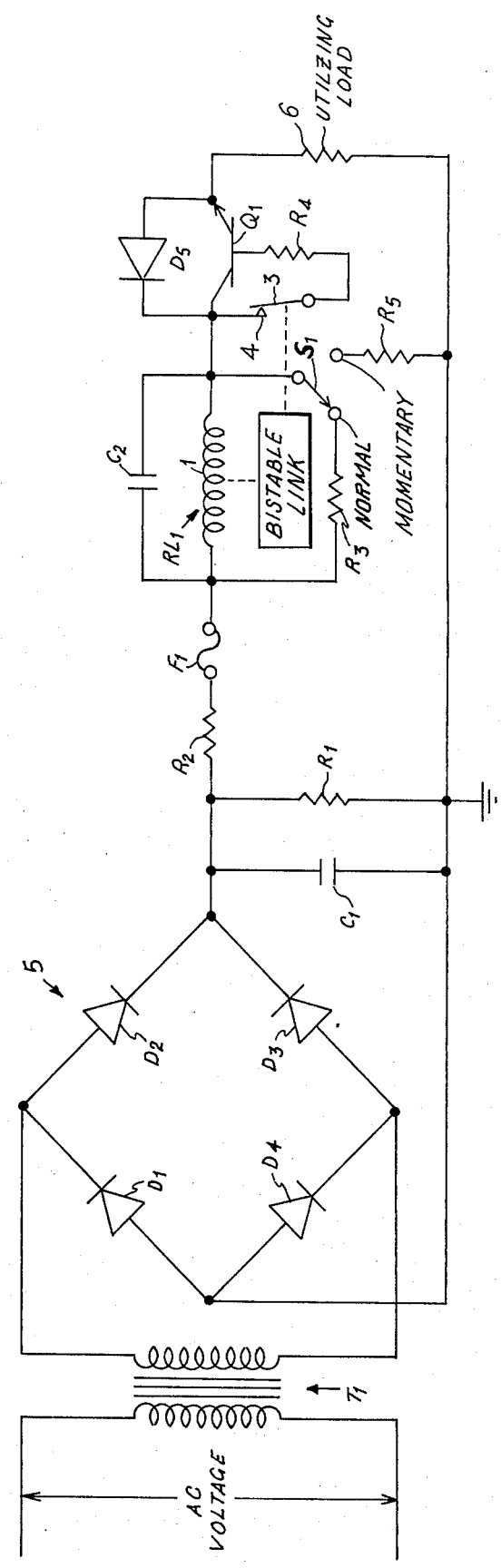

RESETTABLE OVERCURRENT-PROTECTED DIRECT CURRENT POWER SUPPLY

BACKGROUND OF THE INVENTION

This invention relates to direct current (DC) power supplies and more particularly to overcurrent-protected DC power supplies.

The requirements established by underwriting groups to protect a DC power supply from overcurrent conditions greater than one ampere (including reduced load resistances and short circuits) with quick action are conventionally solved by fusing or by energy-limited transformer design.

The effectiveness of the conventional methods mentioned above are limited. Energy limiting transformer for a power supply and transformer having a normal system demand after rectification of 360 milliamperes at 120 volts DC (150 volts DC open circuit) has drawbacks in the size and cost of the transformer as a means of complying with the one ampere overcurrent protection limit specified by Table 725–31 (b) of the 1975 National Electrical Code.

Fuses are faster-acting than circuit breakers in the vicinity of the latter's trip rating, but result in numerous nuisance outages which require fuse replacement to correct.

SUMMARY OF THE INVENTION

An object of the present invention is to provide an overcurrent protection circuit for DC power supplies that overcomes the disadvantages of the above-mentioned conventional methods.

Another object of the present invention is to provide an overcurrent protection circuit for DC power supplies that assures fast shut-off action at all prohibited values of current, safety from a shock standpoint following an outage, as well as safety from a short circuit heat buildup standpoint, combined with minimal nuisance tripping characteristic.

Still another object of the present invention is to provide an overcurrent protection circuit for DC power supplies that assures ease of recovering service after outages.

A feature of the present invention is the provision of a resettable overcurrent-protected direct current power supply comprising: a source of direct current voltage; a utilizing load; a bistable magnetic switch circuit having one terminal coupled to the source of direct current voltage, a contact coupled to the other terminal of the bistable switch circuit and an armature controlled by the bistable switch circuit to make and break contact with the contact, the bistable switch circuit being energized at a given trip-rated current; a transistor having its collector coupled to the other terminal of the bistable switch circuit, its emitter coupled to the load and its base coupled to the armature remote from the contact; and a reset switch coupled to the other terminal of the bistable switch circuit having a normal position to complete a portion of the bistable switch circuit and a momentary contact position, the reset switch being actuated to the momentary contact position after the bistable switch circuit has been energized due to an overcurrent condition to place the armature and the contact in a break state to render the transistor non-conductive and providing the desired overcurrent-protection, said bistable switch circuit deenergizing prior to actuation of the reset switch but the armature and the contact remaining in a break state and actuation of the reset switch causes the bistable switch circuit to re-energize, and the return of the reset switch to the normal position de-energizing the bistable switch circuit to cause the armature and the contact to assume a make state and render the transistor conductive to prepare the bistable switch circuit to protect against a continuing or a new overcurrent condition.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a schematic diagram of a resettable overcurrent-protected DC power supply in accordance with the principles of the present invention.

DESCRIPTION OF THE PREFERRED EMBODIMENT

Referring to the Figure the resettable overcurrent-protected DC power supply utilizes a standardly available, but little-known, type of relay, better described as a bistable magnetic switch $RL_1$ including coil 1, bistable link 2, armature 3 and contact 4, to interrupt conduction of a series pass power transistor $Q_1$ in the rectifier's higher potential output lead. The bistable magnetic switch circuit including bistable magnetic switch $RL_1$, capacitor $C_2$ and resistor $R_3$ is designed to render the pass transistor $Q_1$ non-conductive at nearly (but less than) the one ampere safety limit due to operation of the shuntdesensitized coil 1 and can be reset by an alternate operating path by operating a momentary reset switch $S_1$.

The protection circuits action under all conditions, including an output short circuit is faster than a one ampere fuse (included in the circuit for redundancy protection in case of component failure) and the reset cannot be held to defeat protection during a fault, since the energization of switch $RL_1$ always passes armature 3 and contact 4 in a break state. Deenergization of switch $RL_1$, alternately causes memorized break and make states for armature 3 and contact 4 (bistable operation) causing output interruption faster than a fuse following reset, if a fault on the output still exists during and after operations of reset switch $S_1$. This type of operation is known by safety underwriting groups as "non-hold against fault operation".

A complete component-by-component description of the power supply of the present invention begins with a full wave bridge rectifier 5 including diodes $D_1$, $D_2$, $D_3$ and $D_4$ which obtains alternating current voltage from the secondary winding of transformer $T_1$ and supplies full wave rectified DC voltage to capacitor $C_1$ for peak-charging filtration and bleeder resistor $R_1$ which discharges capacitor $C_1$ when power to the input of rectifier 5 is turned off.

Rectified and filtered DC current is coupled from rectifier 5 and capacitor $C_1$ through limiting resistor $R_2$ whose purpose is to keep output current under shorted-output condition within manageable dissipation limits for transistor $Q_1$.

DC current passes from resistor $R_2$ through wired-in fuse $F_1$ which provides redundant overcurrent protection, and then through the bistable magnetic switch circuit including the parallel combination of bistable magnetic switch $RL_1$, desensitizing resistor $R_3$ connected to the normal position or contact of reset switch $S_1$ and energizationenergy storing capacitor $C_2$. Capacitor $C_2$ is made large enough to reduce the range of vibration of armature 3 for positive armature strokes at and below design trip current.

The resistance value of resistor $R_3$ is selected to desensitize the operation of coil 1 so that a low power coil can be utilized, by dividing the current between coil 1 and resistor $R_3$, and so that trip-rated current causes bistable switch $RL_1$ to energize.

Energization of bistable switch $RL_1$ always opens the base current path of transistor $Q_1$ including base limiting resistor $R_4$, armature 3 and contact 4. When armature 3 and contact 4 are in a break state due to energization of bistable switch $RL_1$, the above base current path of transistor $Q_1$ is opened and renders transistor $Q_1$ non-conductive thereby cutting off output current from transistor $Q_1$ and isolating the utilizing load 6 from the source of DC current by the several megohm's of the "off" resistance of transistor $Q_1$ making the output safe from shock and heat hazards within 15 milliseconds of an overcurrent condition and keeping fuse $F_1$ intact.

Consequently, when bistable switch $RL_1$ is energized armature 3 moves to place armature 3 and contact 4 in a break state. In other words, the contact that had been closed prior to energization of bistable switch $RL_1$ moves to its alternate memorized open state preventing further conduction of transistor $Q_1$. After transistor $Q_1$ has been rendered non-conductive no current passes through coil 1 and, therefore, bistable switch $RL_1$ is de-energized, but the break state of armature 3 and contact 4 remains due to the bistable action of bistable switch $RL_1$.

Diode $D_5$ is connected between the collector and emitter of transistor $Q_1$ in a manner to oppose normal current flow direction to provide transient quenching during the switching-off time of transistor $Q_1$.

Momentary contact reset switch $S_1$ can be manually activated to provide a current path to momentarily re-energize bistable switch $RL_1$ through resistor $R_5$. The resistance value of resistor $R_5$ is selected to draw normal operating current for coil 1 from the voltage of bridge rectifier 5. Armature 3 and contact 4 remains in a break state during this momentary energization of bistable switch $RL_1$ due to the bistable operation thereof.

Manual release of reset switch $S_1$ to its normal contact or position allows de-energization of bistable switch $RL_1$ to place armature 3 and contact 4 in a make state to again render transistor $Q_1$ conductive again.

If the load fault has been cleared, normal operation as described hereinabove occurs again with initiation of transistor $Q_1$ conducting allowable current.

If an overcurrent condition still exists, bistable switch $RL_1$ re-energizes immediately stopping conduction of transistor $Q_1$ and isolating load from source as occurred previously during a fault condition.

The following is a parts list of the component used in a successful reduction to practice of the power supply of the present invention.

$D_1$, $D_2$, $D_3$, $D_4$ — silicon bridge rectifier, maximum average rectified current rated 1.5A, 50A max. at ½ cycle, PRV 600V General Instrument No. KBP06.

$D_5$ — 0.75A/600V silicon diode A600 or GR-22. $Q_1$ — TIP-55A transistor min. $h_{FE}$ of 5, $I_c$ max. = 10A, 50W at 100° C, 250 V DC $V_{CE}$ rating.

$RL_1$ — bistable magnetic switch (RBM Controls Div. of Essex 188 series P/N X0189FE), U.L. approved, 1A contact at 115 VAC/28VDC, dry switching, gold crossbar type contact, 6VDC nominal coil, 4.5VDC pick-up voltage, 100 ohm coil.

$F_1$ — 1A slow-blow pigtail fuse.
$R_1$ — 22K ohm ± 10%/2W resistor.
$R_2$ — 20 ohm ± 10%/10W resistor.
$R_3$ — 10 ohm ± 10%/10W resistor.
$R_4$ — 330 ohm ± 10%/2W resistor.
$R_5$ — 2000 ohm ± 10%/10W resistor.
$S_1$ — SPDT one position normally made one position make (C&K P/N 7108C).
$C_1$ — 200MFD/200V electrolytic capacitor.
$C_2$ — 1500 MFD/50V electrolytic capacitor.
$T_1$ — to supply 100 VRMS at secondary winding.

The above-mentioned reduction to practice was made on a pluggable "daughter" printed circuit board which is compatible with a main amplifier/control unit without requiring any design changes to the main unit.

The power supply of this invention can be applied to:

(1) Situations where occasional short circuits on a DC power supply occur due to frequent system wiring additions during operation or other nuisance overloads require safe limiting of heating and sparking and ease of recovery from outage.

(2) Any situation where a DC power supply's load undergoes unpredictable variations (man-originating or system inherent) which must be restricted from presenting a heat, spark or shock hazard on a nearly instantaneous basis.

(3) In particular, moderately high voltage DC power supplies where either: (a) regulation (to normal demand) can be traded-off to allow current limiting under short circuit conditions, or (b) regulation is maintained through the option of increasing internal impedance of transformer $T_1$, or (c) eliminate current limiting resistor $R_2$ to achieve good regulation by using a high currentrated pass transistor $Q_1$ and/or larger heatsink as design options.

(4) In particular, DC power supplies to deliver current to a load in compliance with National Electric Code overcurrent protection requirements (i.e., 100–150 VDC protected at 1 ampere).

While I have described above the principles of my invention in connection with specific apparatus it is to be clearly understood that this description is made only by way of example and not as a limitation to the scope of my invention as set forth in the objects thereof and in the accompanying claims.

I CLAIM:

1. A resettable overcurrent-protected direct current power supply comprising:
    a source of direct current voltage;
    a utilizing load;
    a bistable magnetic switch circuit having one terminal coupled to said source of direct current voltage, a contact coupled to the other terminal of said bistable switch circuit and an armature controlled by said bistable switch circuit to make and break contact with said contact, said bistable switch circuit being energized at a given trip-rated current;
    a transistor having its collector coupled to said other terminal of said bistable switch circuit, its emitter coupled to said load and its base coupled to said armature remote from said contact; and
    a reset switch coupled to said other terminal of said bistable switch circuit having a normal position to complete a portion of said bistable switch circuit and a momentary contact position, said reset switch being actuated to said momentary contact position after said bistable switch circuit has been energized due to an overcurrent condition to place said armature and said contact in a break state to render said transistor non-conductive and providing the desired overcurrent-protection, said bistable switch circuit de-energizing prior to actuation of said reset switch but said armature and said contact remaining in a break state and actuation of said reset switch causes said bistable switch circuit to re-energize, and the return of said reset switch to said normal position de-energizing said bistable switch circuit to cause said armature and said contact to assume a make state and render said transistor conductive to prepare said bistable switch circuit to protect against a continuing or a new overcurrent condition.

2. A power supply according to claim 1, wherein said source of direct current voltage includes
   a source of alternating current voltage,
   a transformer having a primary winding coupled to said source of alternating current voltage and a secondary winding,
   a full wave bridge rectifier having first pair diagonally related terminals coupled across said secondary winding and a second pair of diagonally related terminals, one terminal of said second pair of terminals being coupled to ground potential,
   a first capacitor coupled between said other terminal of said second pair of terminals and said ground potential for peak-charging filtering, and
   a first resistor coupled in shunt relation with said first capacitor to discharge said capacitor when said power supply is turned off.

3. A power supply according to claim 2, further including
   a second resistor having one terminal coupled to said other terminal of said second pair of terminals for current limiting under a shorted-output condition, and
   a fuse having one terminal coupled to the other terminal of said second resistor and the other terminal coupled to said one terminal of said bistable switch circuit, said fuse providing redundant overcurrent protection at said given trip-rated current.

4. A power supply according to claim 3, wherein said bistable switch circuit includes
   a coil coupled between said one terminal and said other terminal of said bistable switch circuit,
   a bistable link coupled between said coil and said armature,
   a third resistor coupled between said one terminal of said bistable swtich circuit and said normal position of said reset switch to desensitize the operation of said coil, and
   a second capacitor coupled in shunt relation with said coil to reduce the range of vibration of said armature for positive armature stroke at and below said given trip-rated current.

5. A power supply according to claim 4, further including
   a fourth resistor coupled between said momentary contact position of said reset switch and said ground potential, said fourth resistor having a value of resistance to draw normal operating current for said coil.

6. A power supply according to claim 5, further including
   a fifth resistor coupled between said base and said armature remote from said contact to provide a base limiting resistor.

7. A power supply according to claim 6, further including
   a diode coupled between said collector and said emitter opposing normal current flow for quenching transients during switching-off time of said transistor.

8. A power supply according to claim 1, further including
   a first resistor having one terminal coupled to said source of direct current voltage for current limiting under a shortedoutput condition, and
   a fuse having one terminal coupled to the other terminal of said first resistor and the other terminal coupled to said one terminal of said bistable switch circuit, said fuse providing redundant overcurrent protection at said given trip-rated current.

9. A power supply according to claim 8, wherein said bistable switch circuit includes
   a coil coupled between said one terminal and said other terminal of said bistable switch circuit,
   a bistable link coupled between said coil and said armature,
   a second resistor coupled between said one terminal of said bistable switch circuit and said normal position of said reset switch to desensitize the operation of said coil, and,
   a first capacitor coupled in shunt relation with said coil to reduce the range of vibration of said armature for positive armature strokes at and below said given triprated current.

10. A power supply according to claim 9, further including
    a third resistor coupled between said momentary contact position of said reset switch and ground potential, said third resistor having a value of resistance to draw normal operating current for said coil.

11. A power supply according to claim 10, further including
    a fourth resistor coupled between said base and said armature remote from said contact to provide a base limiting resistor.

12. A power supply according to claim 11, further including
    a diode coupled between said collector and said emitter opposing normal current flow for quenching transients during switching-off of said transistor.

13. A power supply according to claim 1, wherein said bistable switch circuit includes
    a coil coupled between said one terminal and said other terminal of said bistable switch circuit,
    a bistable link coupled between said coil and said armature,
    a first resistor coupled between said one terminal of said bistable switch circuit and said normal position of said reset switch to desensitize the operation of said coil, and
    a first capacitor coupled in shunt relation with said coil to reduce the range of vibration of said armature for positive armature strokes at and below said given triprated current.

14. A power supply according to claim 13, further including
a second resistor coupled between said momentary contact position of said reset switch and ground potential, said second resistor having a value of resistance to draw normal operating current for said coil.

15. A power supply according to claim 14, further including
a third resistor coupled between said base and said armature remote from said contact to provide a base limiting resistor.

16. A power supply according to claim 15, further including
a diode coupled between said collector and said emitter opposing normal current flow for quenching transients during switching-off time of said transistor.

17. A power supply according to claim 1, further including
a first resistor coupled between said momentary contact position of said reset switch and ground potential, said first resistor having a value of resistance to draw normal operating current for said bistable switch circuit.

18. A power supply according to claim 17, further including
a second resistor coupled between said base and said armature remote from said contact to provide a base limiting resistor.

19. A power supply according to claim 18, further including
a diode coupled between said collector and said emitter opposing normal current flow for quenching transients during switching-off time of said transistor.

20. A power supply according to claim 1, further including
a first resistor coupled between said base and said armature remote from said contact to provide a base limiting resistor.

21. A power supply according to claim 20, further including
a diode coupled between said collector and said emitter opposing normal current flow for quenching transients during switching-off time of said transistor.

22. A power supply according to claim 1, further including
a diode coupled between said collector and said emitter opposing normal current flow for quenching transients during switching-off time of said transistor.

* * * * *